Feb. 19, 1963    J. C. STILES ET AL    3,077,783
TWO-AXIS ACCELEROMETER
Filed March 24, 1959    2 Sheets-Sheet 1

INVENTORS
John C. Stiles
John F. Emerson
BY
ATTORNEYS

Feb. 19, 1963   J. C. STILES ET AL   3,077,783
TWO-AXIS ACCELEROMETER
Filed March 24, 1959   2 Sheets-Sheet 2

INVENTORS
John C. Stiles
BY   John F. Emerson
ATTORNEYS

United States Patent Office 3,077,783
Patented Feb. 19, 1963

3,077,783
TWO-AXIS ACCELEROMETER
John C. Stiles, Morristown, and John F. Emerson, Hackensack, N.J., assignors to General Precision Inc., a corporation of Delaware
Filed Mar. 24, 1959, Ser. No. 801,497
6 Claims. (Cl. 73—517)

This invention generally relates to improvements in devices for measuring acceleration and more particularly to an improved accelerometer that is unusually sensitive to acceleration along both coordinate axes in a horizontal plane.

The present invention is most concerned with the pendulum variety of acceleration measuring device and particularly with means for improving the accuracy and sensitivity of such devices for use in automatic navigation and control systems on craft operating through air or space or over land or water.

In the usual type of pendulum accelerometer, the bob or mass is stably suspended below a pivot point fastened to the movable body and normally seeks a vertical position below the pivot due to gravity. Acceleration of the body in a horizontal direction accelerates and displaces the pivot, and since the inertia of the bob tends to maintain the bob fixed in space, the axis between the bob and pivot is displaced from the vertical by an amount proportional to the acceleration. However, as the bob is displaced from vertical a horizontal component of the gravity force seeks to return the bob to a vertical position below the pivot. In other words, the gravity force always opposes the direction of displacement and always seeks to return the pendulum to vertical. If the pendulum is spring restrained the combined gravity force component and spring force jointly oppose the displacement whereby the ultimate displacement of the bob with a given acceleration is reduced.

If, on the other hand, the pendulum is inverted with the pivot point vertically below the mass, the horizontal gravity component of force is reversed and rather than opposing the displacement, it operates in a direction to increase the displacement or in opposition to the spring returning force if the pendulum is restrained. Stated in another manner, the inverted pendulum is in a metastable state and the slightest deviation thereof from a true vertical produces a gravitational force component tending to increase the deviation in the same direction with the net result that the inverted pendulum is a much more sensitive means for detecting acceleration and offers great advantages over the normal pendulum whenever the need for extreme accuracy and sensitivity is present.

However, despite these inherently desirable characteristics, the inverted pendulum has rarely, if ever, been employed for extremely accurate measurement of acceleration because of the great precision usually required for its manufacture. Even the slightest initial misalignment of the bob from the true vertical in its null or centered position is magnified by a horizontal gravity component in a direction to increase the error and even the slightest spurious disturbance displaces the bob from a stable to an unstable region.

According to the present invention these disadvantages are to a great extent eliminated by the unique combination of a plurality of features including an improved suspending, balancing, and adjusting means coupled with electromagnetic recentering means and pickoff means, all to the end of providing an accelerometer of unusual sensitivity and ruggedness useful as the heart of a precise navigational system or the like requiring great accuracy and dependability. Furthermore, although the parts are made within close manufacturing tolerances which may be considered extremely accurate according to usual machine shop practice, the tolerances required are not usually severe as compared to those required in the making of other varieties of accelerometer instruments for similar application. Consequently the present invention provides an accelerometer device possessing the superior characteristics inherent in the inverted pendulum arrangement while eliminating many of the shortcomings present in known constructions.

It is accordingly one object of the present invention to provide an accelerometer of improved accuracy and sensitivity for measuring acceleration along any axis in a geometric plane.

Still another object is to provide such an accelerometer which is rugged and dependable and does not require excessive servicing, maintenance, or other attention.

Other objects and many attendant advantages will be more readily comprehended by those skilled in the art upon a detailed consideration of the following specification and drawings wherein.

Figure 1:
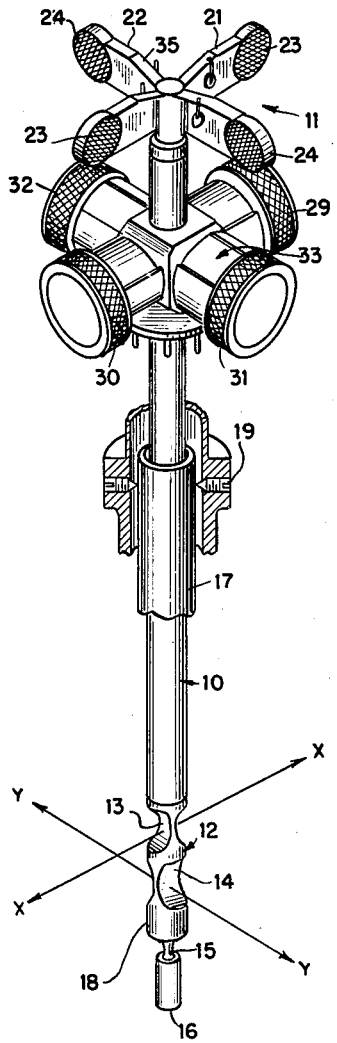
FIGURE 1 is a perspective view of one preferred pendular element according to the present invention.

Referring now to the drawings for a detailed consideration of one preferred embodiment of the invention, there is shown in FIGURE 1 the inverted pendular member comprising an elongated upright rigid pendulum arm 10 carrying at its upper end a mass, generally designated 11, and being supported at its lower end by a flexure member 12 for tilting movement about both the X and Y axes.

The flexure member 12 is preferably formed of a unitary solid cylinder of resilient spring metal having a plurality of machined or otherwise necked portions 13, 14, and 15 along planes through the longitudinal axis of the arm (10) substantially perpendicular to one another, which define spaced positions about which the pendulum arm 10 may resiliently flex in two directions. The upper necked portion 13 faced in the direction of the X axis, and accordingly may flex in this direction; the next lower necked portion 14 faces in the direction of the Y axis and may flex in such direction; and the lowermost portion 15 is necked down to a small diameter to permit flexure in both the X and Y directions. Consequently, when the base of the pendulum arm 10 is firmly anchored in place, the combination of pendular arm 10, mass 11, and flexure means 12 form a restrained inverted pendulum which may tilt in the direction of the X axis about a solid spring pivot at position 13 and in the direction of the Y axis about a solid spring pivot at position 14, and about both X and Y axes at the lowermost pivot position 15, thereby to provide an inverted pendulum that is universally pivotable about both the X and Y axes, as well as intermediate points therebetween.

As was generally discussed above, the inverted pendulum is in a metastable condition and is balanced only when its mass is in a true vertical above the pivot since only then is all of the gravity force concentrated downwardly. The smallest departure of the mass from this vertical position produces a transverse gravity force component which operates in a direction to increase this displacement thereby rendering the pendulum unbalanced.

According to the present invention there is provided means for initially tilting the pendular arm 10 about the lowermost pivot position 15 to align its effective axis at null with the true vertical and, in addition, fixing the pivot 15 in this adjusted position whereby the inverted pendulum will thereafter remain substantially balanced when in its null position and thus possess the maximum in sensitivity and accuracy, as desired.

Figure 2:
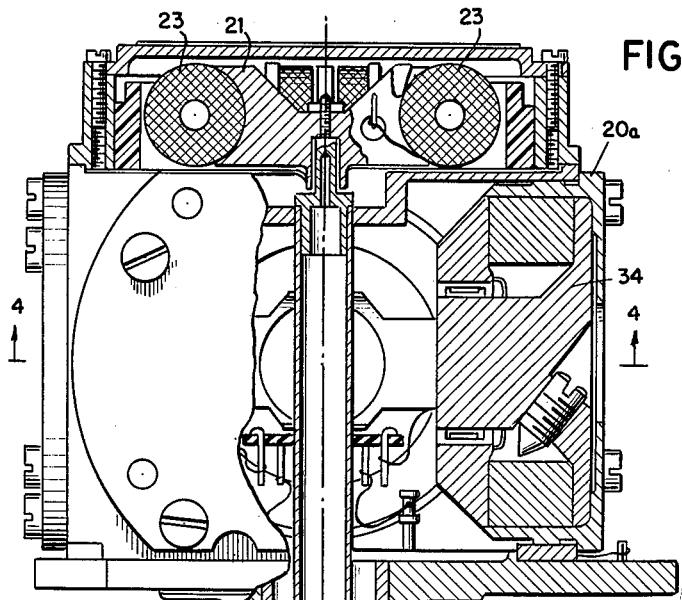
FIGURE 2 is a vertical cross-section of the entire pendulum device incorporating the element of FIGURE 1.
Figure 5:
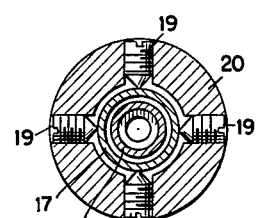
FIGURE 5 is a transverse cross-section taken along lines 5—5 of FIGURE 2 to illustrate the null positioning means.

As best shown in FIGURE 2, the null adjusting means preferably includes an upright elongated lever tube 17 coaxially spaced about the pendulum arm 10 and portions of the flexure support 12 and being rigidly fastened at its lowermost position to the flexure support 12 at a position 18 intermediate the two lowermost pivot positions 14 and 15 thereon. The upper end portions of lever tube 17 bear against the pointed tips of a plurality of circumferentially disposed adjusting screws 19 which are threadably supported in a fixed housing 20 enclosing the movable pendulum elements. If desired, a total of four such adjusting screws 19 may be employed as shown in FIGURE 5; two of which may be located in opposed relation on diametrically opposite sides of lever 17 in a direction along the X axis and the remaining two along the Y axis. Since the base 16 of the flexure 10 is firmly anchored in the housing 20, adjustment of these screws 19 produces a force against the upper portion of lever tube 17 which is magnified by the mechanical advantage provided by elongated lever tube 17 and laterally applied against the flexure at position 18. This force tilts or bends the combined flexure and pendulum arm about solid pivot 15 in the direction determined by the selected screws 19 that are adjusted, thereby enabling the pendulum arm to be precisely tilted in its null position to a balanced metastable condition. Since the base 16 of the pendulum arm 10 is rigidly held and since the lever tube 17 is rigidly fastened to the flexure support 12 directly above pivot location 15, pivot 15 is locked in this adjusted position against further pivoting action and consequently acceleration induced excursions of the mass 11 compel the pendulum arm to pivot about either or both pivot locations 13 or 14 located above pivot 15.

As thus far described it is evident that there is provided an inverted pendulum of rugged construction that is pivotally supported proximate its base by a solid spring flexure means for universal tilting movement, the flexure means having a different spaced pivot location for each direction of movement and an additional spaced pivot location for enabling the accurate alignment of the effective pendulum axis at null position with the true vertical.

To complete the functions provided by the accelerometer of the present invention, there is additionally provided pickoff means supported at the top of pendulum arm 10 for generating electrical signals proportional to displacement of the pendulum from vertical about both the X and Y axes and torque generating means also supported proximate the upper end of the pendulum arm 10 and having the function of generating electromagnetic forces against the arm in both the X and Y directions to tilt the pendulum about these axes for restoring the pendulum to its null vertical position or for other purposes as is known to those skilled in the art. The pickoff means and torque generating means according to the present invention are symmetrically disposed about the upper end of the pendulum arm and together constitute the pendulous mass 11 of the pendulum.

Figure 3:
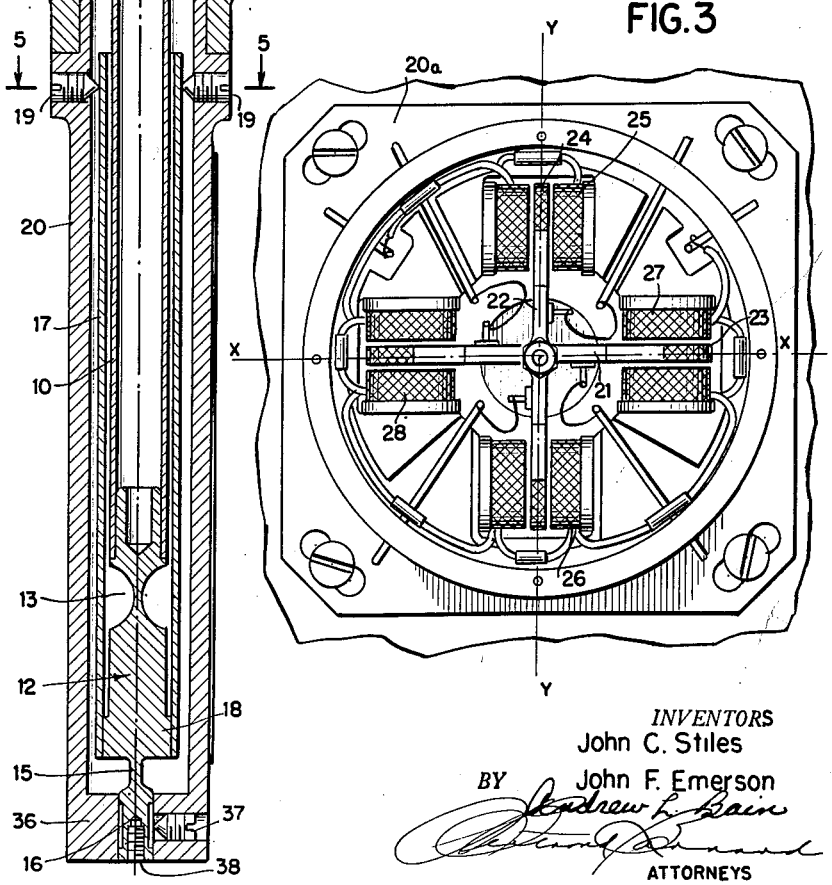
FIGURE 3 is a plan view of the accelerometer with the top cover removed illustrating the signal generating means.

Referring again to FIGURE 1 and to FIGURE 3 for a detailed consideration of the pickoff means, there is supported at the uppermost end of the pendular arm 10, a pair of transverse cross arms 21 and 22 with arm 21 being directed along the X axis and arm 22 along the Y axis. Each arm carries at its opposite ends a set of substantially flat wound coils 23 and 24, respectively, whereby the four coils are circumferentially displaced from each other about the end of pendular arm 10 by 90 degrees as shown in FIGURE 1.

Associated with each of these four pickoff coils is a pair of energized opposed stationary field windings 25, 26, 27, and 28, having an air gap, with the field windings being fixedly supported by the upper section of the housing 20a and circumferentially displaced by 90 degrees as best shown in FIGURE 3. As shown, each of the pickoff coils in the sets 23 and 24 is disposed within the air gap of its associated field winding when the pendular element is properly positioned within the upper housing 20a whereby movement of the pendulum with respect to the upper housing 20a in any direction in the plane of the X and Y axes moves the coils 23 and 24 within the air gaps of their respective field windings in a coordinate manner and any such movement in this plane is resolved into its X and Y coordinate components. Since the field windings 25, 26, 27, 28 are suitably energized (not shown), movement of the pairs of pickoff coils from a central balanced position produces induced voltages therein representative of the displacement of the pendulum about its X and Y axes.

These pickoff signal voltages may be directed to energize a control or navigation system of which the accelerometer is a part, and are further employed to reposition the pendular element by means of the electromagnetic torque generating means as will be described more fully hereafter.

To provide an electromagnetically operated torque means for repositioning the pendular element about its X and Y axes, there is provided a plurality of permanent magnets, and a like plurality of torque coils, with one group of these members being supported on the pendular element and the other being fastened to the housing, whereby energizing the coils attracts or repels the magnets to tilt the pendulum about its X and Y axes, as desired. Referring to FIGURE 1, there is shown four such torque windings 29, 30, 31, and 32, mounted on a symmetrical cross shaped structure 33 having hollow cylindrical legs and being supported below the pickoff coils 23, 24. As shown, two of these coils 29 and 30 are wound about opposing legs of the cross member in the direction of the X axis, and the remaining two coils 31 and 32 about the other two legs facing in the direction of the Y axis thereby to enable the generation of reversible electromagnetic torques transversely to the pendulum arm 10 in the direction of the X and Y axes.

Figure 4:
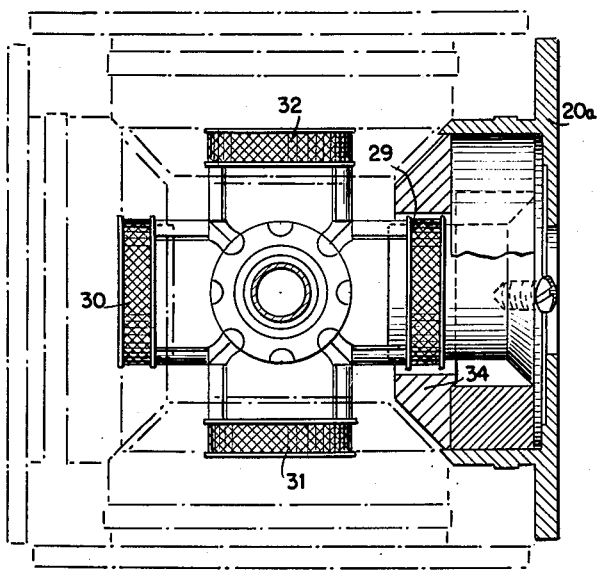
FIGURE 4 is a transverse cross-section taken along lines 4—4 of FIGURE 2 to illustrate the torque generating means.
Figure 6:
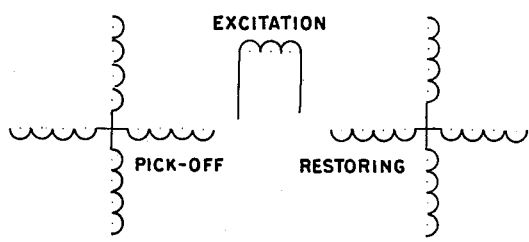
FIGURE 6 is a circuit diagram showing schematic operation of the unit.

As best shown in FIGURES 2 and 4, a plurality of salient pole permanent magnets 34 are supported about the inside of the housing and project transversely toward the central axis thereof. These magnet poles 34 are also so spaced about the pendulum as to each mate with a different one of the torque coils 29, 30, 31, 32 by projecting outside the hollow tubular arms about which the torque coils are wound, as best shown in FIGURE 4. Consequently the torque coils and opposing permanent magnet poles provide an effective means for recentering the pendulum after an acceleration induced excursion thereof.

As is well known, the pendulum accelerometer is most sensitive to acceleration in a horizontal plane when the pendulum element is in centered position or at null. It is accordingly intended in the device of the present invention that the extent of displacement of the pendulum from null in response to acceleration forces will be extremely small for maximum accuracy and sensitivity, and consequently the pickoff means, torque generating means, and spring force of the flexure are all constructed with this consideration in mind. Additionally the torque generating coils are preferably electrically connected in feedback relation with the output signal from the pickoff coils whereby promptly after tilting of the pendulum in response to an acceleration, the torque coils are energized in such a manner as to provide an electromagnetic force against the pendulum in a direction to restore its position to the vertical. The feed-back current energizing the torque windings may also be employed to obtain information concerning velocity or distance traveled, by suitably integrating this feed-back signal. However, since various of such feed-back means are known to those skilled in the art further details thereof are not believed necessary.

To concentrate substantially all of the pendular mass at the uppermost position of the pendular arm 10, the pendular arm 10 is preferably made in the form of a rigid hollow tube, with the pickoff coil means and torque generating coils rigidly fastened at its upper end by suitable brackets, as shown, and with the lower end of this pendulum arm tube coaxially fitting over and being firmly attached to the upper portion of the flexure member 12.

The movable element of the accelerometer represented by the pendular arm 10, mass 11 and flexure member 12 is preferably enclosed within housing 20 consisting generally of an elongated tubular shell opening into the upper housing portion 20a which accommodates the pickoff means and torque generating means as described above. The lower shell is closed to provide a base 36 in which the base portion 16 of the flexure means 12 may be securely anchored by means such as set screws 37 and 38, as shown. The upper housing portion 20a is suitably outfitted with supporting brackets and the like for rigidly fastening the pickoff field winding and permanent magnet pole structure for the torque generating means as well as terminal lead connectors and the like for conducting and transmitting the energizing and signal currents to and from the various windings. Consequently the accelerometer of the present invention is of an extremely rugged construction as well as being extremely sensitive.

Although the present invention has been described in connection with an exemplary embodiment, it is to be understood that modifications and variations in its construction, arrangement and utilization may be made within the broader principles and scope thereof, as set forth in the following claims.

What is claimed is:

1. In an accelerometer, a housing, said housing including a relatively long tubular section, the tubular section of the housing having a base integral with one end thereof, an elongated upright member carrying a mass at its upper end and having its lower end anchored in the base of the tubular section of the housing, said elongated upright member being flexible about at least two vertically displaced necked portions proximate the base of the tubular section of the housing, and an elongated tube co-axially spaced about said elongated upright member with the lower end of the elongated tube fastened to the elongated upright member at a location intermediate said flexible necked portions, and means supported by said housing for variably positioning said elongated tube to displace said elongated upright member about its lower flexible necked portion, said elongated tube being operative to laterally support the elongated upright member against further pivoting about said lower flexible necked portion whereby acceleration of the housing including the base may cause flexure of the elongated upright member only about its upper flexible necked portion.

2. In an accelerometer, a housing, an upright flexure member having one end thereof rigidly supported in the housing, said upright flexure member being operative to flex about at least two vertically displaced necked portions thereof, an elongated upright member supported at the other end of the upright flexure member and carrying a mass thereon, and an elongated tube co-axially spaced about said elongated upright member with the lower end of the elongated tube fastened to the upright flexure member at a location intermediate said flexible necked portions, and means supported by said housing for variably positioning said elongated tube to displace said elongated upright member about its lower necked portion, said elongated tube being adapted to support the elongated upright member in the true vertical and prevent flexure at said lower flexible necked portion with displacement of said mass in response to external acceleration of the housing, thereby to align the elongated upright member with the true vertical.

3. In an accelerometer, a housing, an elongated upright member having its lower end rigidly supported in the housing, a mass supported on the end of said upright member, opposite the end supported in the housing, said upright member being operative to flex about at least two vertically displaced flexible necked portions thereof proximate its lower end, and an elongated tubular member surrounding said elongated upright member and fastened thereto only at a location intermediate said flexible necked portions, and means supported by said housing for variably positioning said elongated tubular member to displace said elongated upright member about its lower flexible necked portion, and said elongated tubular member being adapted to support the elongated upright member in the true vertical and prevent flexure at said lower flexible position with displacement of said mass in response to external acceleration of the housing, said mass including a plurality of displacement pickoff means cooperating with field windings supported by means on said housing to produce a voltage signal representative of relative displacement between said mass and housing and including a plurality of torque generating means operating in cooperation with a plurality of permanent magnets attached to said housing to vary the relative positioning of the mass and the housing.

4. An accelerometer comprising an inverted pendulum including a substantially vertical upright and an electromagnetic pickoff and torque windings, the upright being supported at its lower end and the electromagnetic pickoff and torque windings being supported on and constituting a mass at the top of the upright; a housing enclosing said pendulum, a flexure member anchoring the lower end of the vertical upright within the housing, and an elongated tubular element secured co-axially to the flexure member and extending substantially co-axially around said upright from below the lower end of the upright, to a distance intermediate the ends of the upright; a plurality of threaded elements adjustably threaded in the housing to apply a desired force appropriately directed against the free end of the tubular element to tilt the upright through a desired adjustment angle.

5. An accelerometer comprising, a housing, an inverted pendulum consisting of a substantially vertical upright supporting a mass at the top thereof, substantially solid flexure means for supporting the upright, said solid flexure means being operative to flex about a first flexible necked portion thereon, and means for adjustably tilting the upright about a second flexible necked portion of said flexure means to cause the upright to assume a desired neutral position relative to said first flexible necked portion, the second flexible necked portion being adapted to allow the pendulum to move in a plane substantially perpendicular to the plane through which the pendulum moves about the first flexible necked portion, an electro-magnetic induction device having a stationary secondary coil supported by the housing and a movable primary coil, the movable primary coil being supported at the top of the vertical upright and constituting part of the mass, said movable primary coil being energized during operation and operating to induce a signal voltage in the stationary secondary coil when the vertical upright is displaced from its neutral position, means for applying a restoring torque to the vertical upright to restore the upright to its neutral position after a displacement thereof; said means comprising a magnetic-field producing means having an air gap and an armature coil; and means secured to the upright and disposed in the air gap to be affected by the flux field of the magnetic field producing means according to the extent to which the armature coil is being energized.

6. An accelerometer comprising an inverted pendulum including a substantially vertical upright, said upright being pivotally supported below its lower end about a pivot point, and further including a mass supported on the upright proximate the top thereof; a housing for the pendulum and including an element to serve as a base to support the pendulum; flexure means anchoring the lower end of the upright to the base, said flexure means having a necked portion between the upright and the base, said necked portion being resilient and disposed substantially co-axially with the upright axis and serving to define the locus of a virtual pivot point for the upright; signal-generating means including a stationary coil structure and a magnet field structure, with one structure supported by the housing and the other by the upright and constituting part of the mass of the pendulum; an elongated tube co-axially spaced about said upright, with the lower end of the tube fastened to the upright at a location intermediate said flexible necked portions, and means supported by said housing for variably positioning said elongated tube to displace said upright about its lower flexible necked portion, to substantially align the upright axis parallel to the vertical axis in a neutral position, and electromagnetic torque means partly supported by the housing and partly by the upright, for applying a force to restore the nominally vertical upright to its neutral position upon an excursion of a portion of the upright therefrom.

References Cited in the file of this patent

UNITED STATES PATENTS

| | | |
|---|---|---|
| 1,623,571 | Bellman | Apr. 5, 1927 |
| 2,453,548 | Statham | Nov. 9, 1948 |
| 2,494,109 | Wolfe | Jan. 10, 1950 |
| 2,665,896 | Kirby et al. | Jan. 12, 1954 |
| 2,793,851 | Ruge | May 28, 1957 |
| 2,839,733 | Bassett | June 17, 1958 |

FOREIGN PATENTS

| | | |
|---|---|---|
| 791,827 | Great Britain | Mar. 12, 1958 |